US011629840B2

(12) United States Patent
Vuerli et al.

(10) Patent No.: US 11,629,840 B2
(45) Date of Patent: Apr. 18, 2023

(54) LIGHTING AND/OR SIGNALING DEVICE FOR VEHICLES WITH CAP FOR SPACER MADE IN ONE PIECE WITH GASKET

(71) Applicant: MARELLI AUTOMOTIVE LIGHTING ITALY S.p.A., Venaria Reale (IT)

(72) Inventors: Michele Vuerli, Udine (IT); Giancarlo Cella, Udine (IT)

(73) Assignee: MARELLI AUTOMOTIVE LIGHTING ITALY S.p.A., Venaria Reale (IT)

( * ) Notice: Subject to any disclaimer, the term of this patent is extended or adjusted under 35 U.S.C. 154(b) by 0 days.

(21) Appl. No.: 17/119,242

(22) Filed: Dec. 11, 2020

(65) Prior Publication Data

US 2021/0180764 A1 Jun. 17, 2021

(30) Foreign Application Priority Data

Dec. 13, 2019 (EP) ..................... 19425090

(51) Int. Cl.
*F21S 45/50* (2018.01)
*F21S 41/20* (2018.01)
(Continued)

(52) U.S. Cl.
CPC ............ *F21S 45/50* (2018.01); *B60Q 1/0408* (2013.01); *B60Q 1/0483* (2013.01); *F16J 15/102* (2013.01); *F21S 41/28* (2018.01); *F21S 43/26* (2018.01)

(58) Field of Classification Search
CPC .. B60Q 1/0408; B60Q 1/0433; B60Q 1/0441; B60Q 1/0458; B60Q 1/0466;
(Continued)

(56) References Cited

U.S. PATENT DOCUMENTS

2014/0001708 A1* 1/2014 Ewing ................. B23K 26/082
277/590

FOREIGN PATENT DOCUMENTS

DE  3424577 A1   1/1986
DE  19511165 A1  10/1996
(Continued)

OTHER PUBLICATIONS

Dictionary definition of spacer, retrieved from dictionary.cambridge.org on Jun. 29, 2022 (Year: 2022).*
(Continued)

*Primary Examiner* — Keith G. Delahoussaye
*Assistant Examiner* — Steven Y Horikoshi
(74) *Attorney, Agent, or Firm* — Howard & Howard Attorneys PLLC (57) ABSTRACT

A lighting and/or signalling device for motor vehicles, comprising: a container body, a lenticular body that forms a housing chamber; at least one light source, arranged inside the housing chamber; a first gasket made of elastomeric material, which extends along at least one part of a perimeter edge of the container body and which defines a barrier to the ingress of water and/or foreign bodies between the container body and the bodywork. The housing body includes one or more spacer elements, each of which consists of an appendix which protrudes from the housing body in a predetermined position and abuts against the bodywork in the housing seat. Each spacer element is provided with a cap made of elastomeric material applied to cover at least one free end portion of the spacer element.

13 Claims, 5 Drawing Sheets

(51) Int. Cl.
*F21S 43/20* (2018.01)
*B60Q 1/04* (2006.01)
*F16J 15/10* (2006.01)

(58) Field of Classification Search
CPC .. B60Q 1/0483; B60Q 1/2638; B60Q 1/2653; F21S 41/19; F21S 41/192; F21S 41/55; F21S 45/50
See application file for complete search history.

(56) References Cited

FOREIGN PATENT DOCUMENTS

| | | |
|---|---|---|
| DE | 69501875 T2 | 7/1998 |
| EP | 3412505 A1 | 12/2018 |
| GB | 2344874 A | 6/2000 |

OTHER PUBLICATIONS

Dictionary definition of seat, retrieved from Merriam-Webster.com on Jun. 29, 2022 (Year: 2022).*
Communication dated Apr. 7, 2020 transmitting the Extended European Search Report dated Mar. 23, 2020 for European Application No. 19425090.

\* cited by examiner

LIGHTING AND/OR SIGNALING DEVICE FOR VEHICLES WITH CAP FOR SPACER MADE IN ONE PIECE WITH GASKET

CROSS-REFERENCE TO RELATED APPLICATIONS

The present application claims priority to and all the benefits of European Patent Application No. 19425090.8, filed on Dec. 13, 2019, which is hereby expressly incorporated herein by reference in its entirety.

BACKGROUND OF THE INVENTION

1. Field of the Invention

The present invention relates to a lighting and/or signalling device for vehicles.

2. Description of the Related Art

The expression "lighting and/or signalling device for vehicles" is generally understood to include devices positioned outside the vehicle, such as an automotive tail light, an automotive headlamp (also named headlight) or a rear window lighting device.

An automotive lighting device (front or rear) comprises at least one light external to the vehicle having the function of illuminating and/or signalling towards the outside of the vehicle, such as, for example, a position light, a turn signal, a brake light, a rear fog lamp, a reversing lamp, a dipped beam headlamp, a main beam headlamp and the like.

Typically, an automotive lighting device, in its simplest generalization, comprises a container body, a lenticular body and at least one light source.

The lenticular body is arranged to close the mouth of the container body so as to form a housing chamber. The light source is arranged inside the housing chamber and may be faced so as to emit light towards the lenticular body when it is powered with electricity.

An automotive lighting device is intended to be associated with the bodywork or chassis of a vehicle at a specific housing seat at least partially counter-shaped with respect to the housing body of the lighting device itself. The housing body is fixed by shape coupling to the housing seat and held therein by one or more fasteners, e.g. consisting of bolts or snap fasteners.

In order to guarantee the function of the lighting device over time, it is necessary to ensure an adequate watertight seal between lighting device and housing seat.

For such a purpose, at least two elastomeric gaskets are arranged between the housing body and the housing seat.

A first elastomeric gasket is arranged along the outer perimeter edge of the housing body and acts as a protective barrier against jets of water. Such a first gasket may also cover only part of the perimeter edge of the housing body of the lighting device. More specifically, the first gasket closes a gap formed between the edge of the lighting device and the body of the motor vehicle so as to prevent the ingress of jets of water or dirt into this space.

A second elastomeric gasket (called in jargon "gasket") is, instead, specifically dedicated to directly protecting the light source and the electrical connections of the lighting device and is therefore arranged in a more inner position with respect to the perimeter edge of the lighting device. More specifically, this second elastomeric gasket (gasket) is suitable to prevent the ingress of water and/or dirt into the inner chamber of the lighting device defined between the housing body and the lenticular body.

In order to allow the correct positioning, alignment and centering of the lighting device inside the housing seat of the body, the lighting device is provided equipped with a positioning system called RPS (Reference Point System), which makes it possible to position, align and center the housing with respect to the three axes X, Y and Z inside the housing seat of the bodywork. In particular, such an RPS comprises one or more appendixes which protrude from the housing body and are intended to abut against the bodywork of the vehicle acting as spacer elements with respect to the depth of the housing seat, generally identified as X-axis.

Generally, such one or more spacer elements are made near the outer edge of the housing of the container body so that they are more easily visible during installation and thus facilitate the assembly of the lighting device.

Generally, in order to avoid direct contact between the spacer elements and the bodywork, the appendixes which define such spacer elements are provided with elastomeric caps to protect the surface integrity of the vehicle body, which is undergone to continuous friction with the spacer elements, during the use of the vehicle. In this manner, the elastomeric caps avoid the onset of corrosive phenomena of the painted sheet metal due to the abrasion of the paint itself at the points of contact with the spacer elements.

In order to prevent such caps from accidentally detaching from the spacer elements, the caps are internally fitted with an adhesive film which is added to the shape coupling between cap and spacer element, thus ensuring a more stable connection.

SUMMARY OF THE INVENTION

In the manufacturing process of an automotive lighting device, the management of the aforesaid elastomeric caps is burdensome and is in conflict with the trend to increase production rationalization, aimed at containing costs.

Indeed, the manufacturing of such caps cannot be limited to molding them but must also comprise a subsequent step of applying an adhesive film, with an increase in complexity which negatively affects production costs.

The management of lighting device's component stocks is also negatively affected by the need to manage such elastomeric caps as separate components.

Finally, the assembly of the caps in the lighting device, although not complex in itself, must necessarily be included in the assembly sequence of the lighting device, thus increasing its complexity.

However, eliminating elastomeric caps from an automotive lighting device is not acceptable because this would adversely affect the functionality of the lighting device itself, as described above.

The need (still completely not met to date) is therefore felt in the prior art to make automotive lighting devices and in general lighting and/or signalling devices for vehicles, which, while continuing to comprise elastomeric caps for the spacer elements, make it possible to simplify the manufacturing, management and assembly of such caps.

Such needs are met by a lighting and/or signalling device for vehicles of the present invention.

BRIEF DESCRIPTION OF THE DRAWINGS

Further features and advantages of the present invention will be more comprehensible from the following description of preferred embodiments given by way of non-limiting examples, in which.

Elements or parts in common to the embodiments described below will be indicated using the same reference numerals.

DETAILED DESCRIPTION OF THE INVENTION

With reference to the aforesaid figures, reference numeral 1 indicates a lighting and/or signalling device for vehicles according to the present invention.

As used herein, the expression "vehicle lighting and/or signalling device" is generally understood to mean lighting and/or signalling devices positioned outside the vehicle, such as an automotive tail light, an automotive headlamp or a rear window lighting device.

According to a general embodiment of the present invention, the lighting and/or signalling device 1 for motor vehicles comprises:
- a container body 10, which is intended to be associated with the bodywork C of a vehicle at a dedicated housing seat;
- a lenticular body (20), placed to close a mouth of the container body (10) so as to form a housing chamber (2);
- at least one light source (not shown in the accompanying figures), arranged inside the housing chamber (2).

The lighting and/or signalling device 1 for motor vehicles comprises a first gasket made of elastomeric material 30, which extends along at least one part of a perimeter edge 11 of the container body 10 and which in use defines a barrier to the ingress of water and/or foreign bodies between the container body 10 and the bodywork C.

According to the embodiment shown in the accompanying figures, the aforesaid first gasket 30 comprises a main support body 31, at which the first gasket 30 is connected to the container body 10.

A sealing lip 32 extends from such main support body, which sealing lip is intended to be pressed against the body during the assembly step of device 1 in the corresponding housing seat in order to make sealing.

Figure 8:
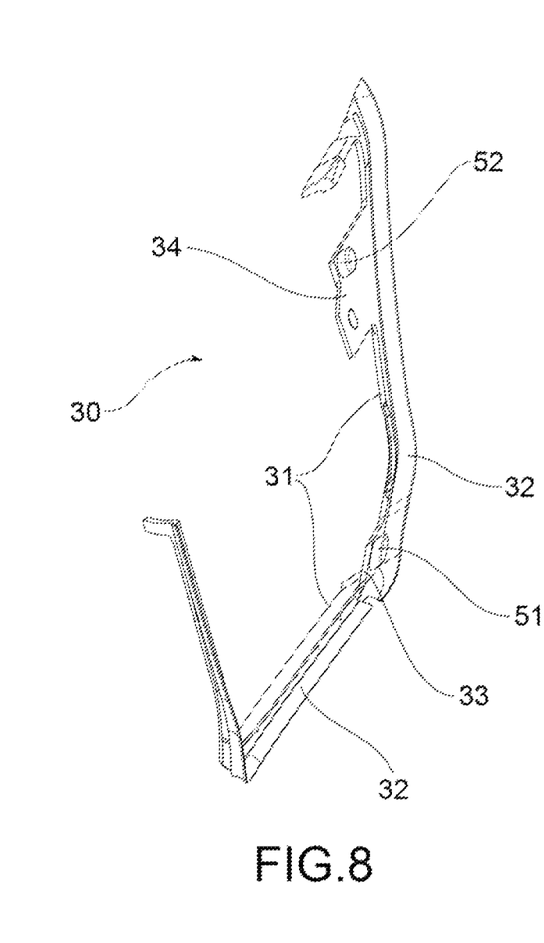
FIGS. 8 and 9 show two perspective views of a component of the lighting device in FIG. 7 related to a perimeter sealing gasket.
Figure 9:
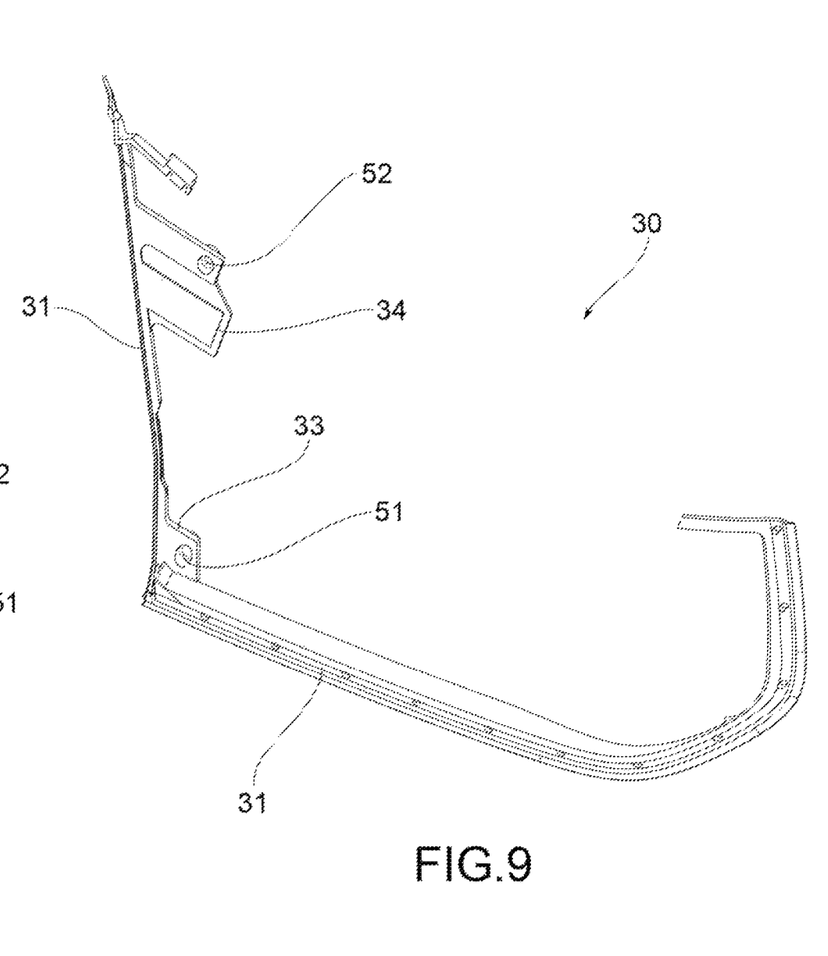

As shown in particular in FIGS. 8 and 9, the aforementioned first gasket 30 can also cover only part of the perimeter edge 11 of the container body 10.

The housing body 10 defines the supporting structure of all components of the lighting and/or signalling device 1. Preferably, it is made of a plastic molding material.

Figures 1, 2:
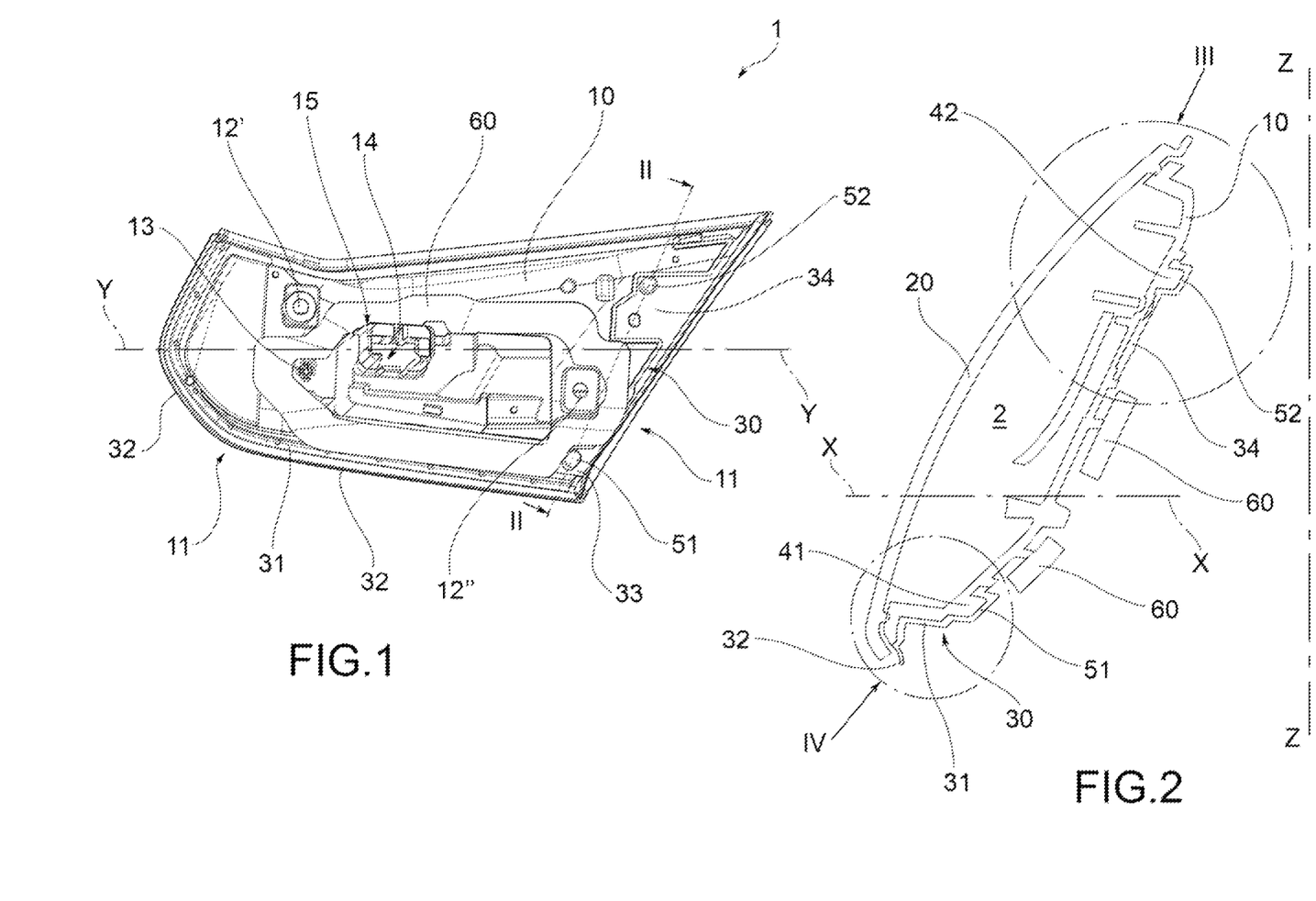
FIG. 1 shows an orthogonal view of a lighting/signalling device, consisting of an automotive lighting device according to a particular embodiment of the invention, shown from the side which in use is facing towards the housing seat of the lighting device itself obtained in the vehicle bodywork.
FIG. 2 shows an orthogonal section view of the lighting device in FIG. 1, taken along a section plane A-A shown there, illustrated with some parts removed and others arranged diagrammatically for the sake of ease of illustration.
Figure 5:
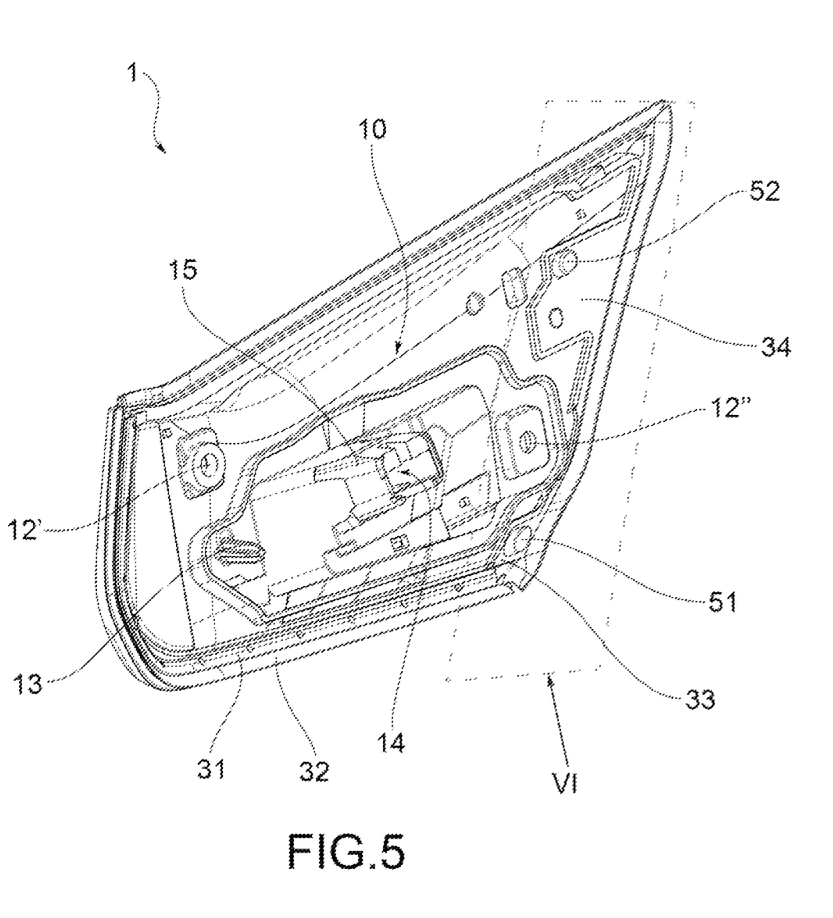
FIG. 5 shows a perspective view of the lighting device in FIG. 1.
Figure 6:
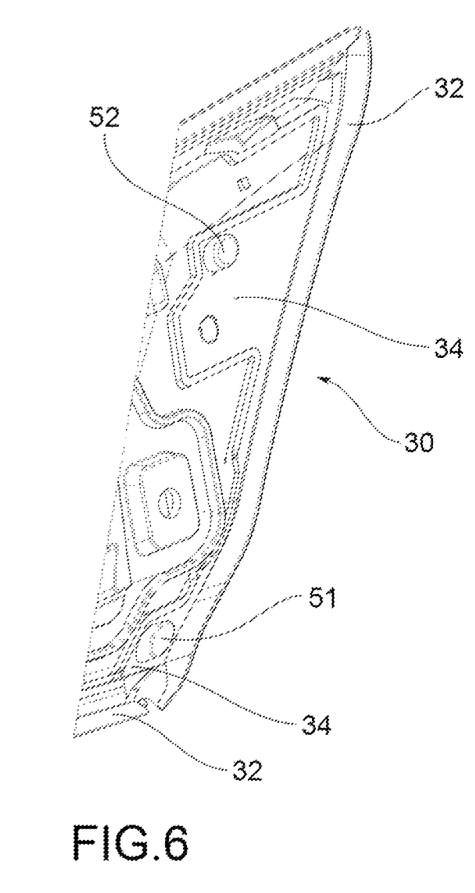
FIG. 6 shows an enlarged view of FIG. 5, relative to a portion of the lighting device enclosed in the box indicated by VI.
Figure 7:
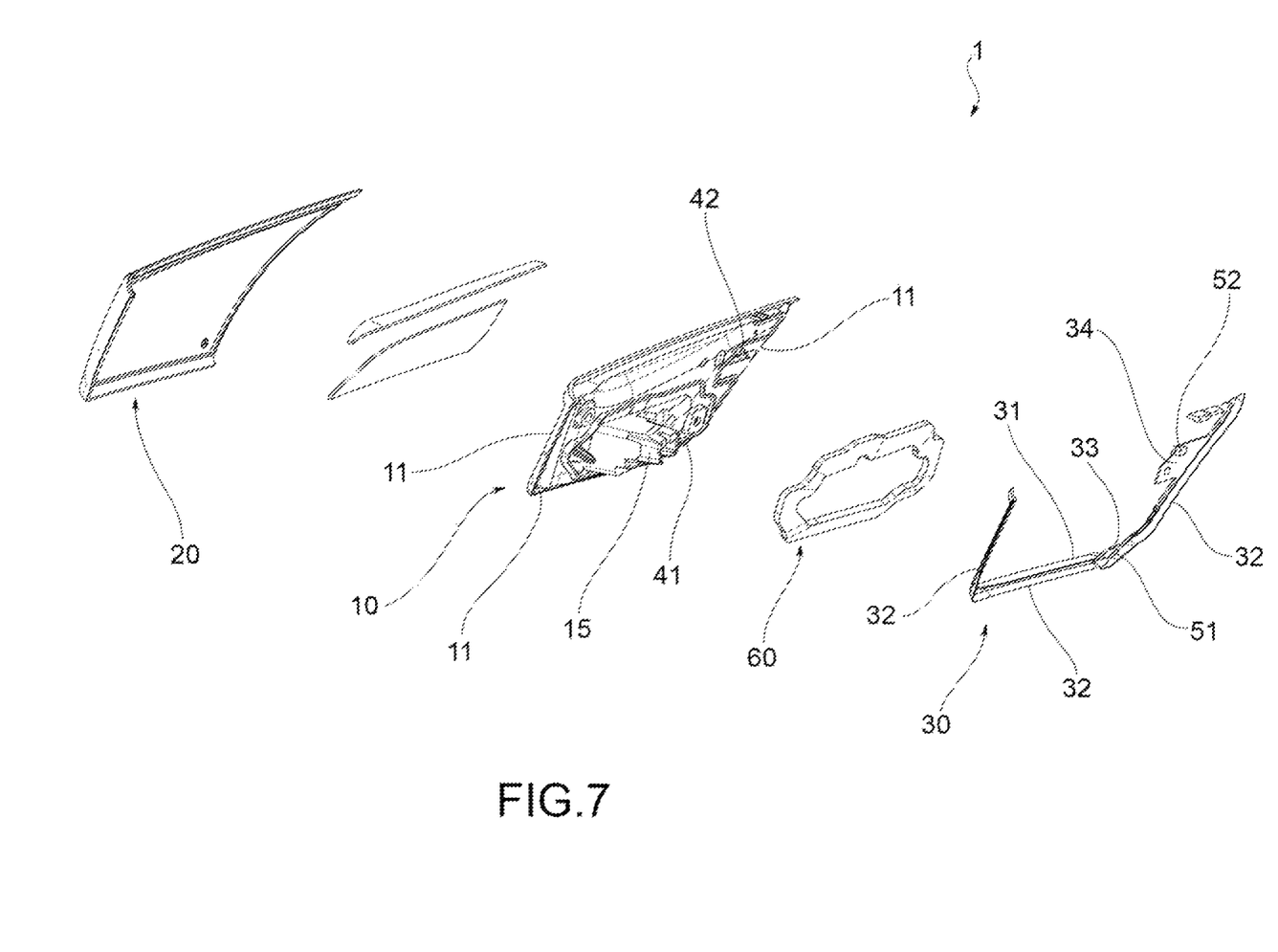
FIG. 7 is a diagrammatic, perspective, exploded view of the lighting/signalling device (lighting device) shown in FIG. 1.

As shown in particular in FIGS. 1 and 5, at the portion of the container body 10 intended to face the housing seat of bodywork (then opposite to the portion of the container body 10 facing the lenticular body 20), the container body 10 can be provided with one or more seats 12' and 12" for the insertion of fixing elements to the bodywork, such as bolts (not illustrated in the accompanying Figures). Either additionally or alternatively, the container body 10 may be provided with one or more appendixes 13 suitable to snap-fit into dedicated openings in the bodywork, so as to define snap-fit fixing means.

Advantageously, as will be resumed below, the bolts or screws which engage the seats 12' and 12", as well as the aforesaid appendixes 13 can be part of a positioning system of device 1 in the housing seat 2 of the bodywork C, called in jargon RPS system (Reference Point System).

Preferably, the housing body 10 is provided with at least one through-opening 14 to allow the passage of electrical interconnections inside the housing chamber 2. In particular, as shown in particular in FIG. 5, such an opening 14 can be obtained at a box-shaped portion 15 defining a positioning seat of the aforesaid at least one light source.

Advantageously, the automotive lighting and/or signalling device 1 can comprise a second elastomeric gasket 60 which acts as a barrier for the ingress of water and/or foreign bodies into the housing chamber 2.

More in detail, as shown in particular in the accompanying figures, such a second gasket 60, preferably ring-shaped, is associated with the container body to create a barrier about the aforesaid through opening 14, i.e. the opening through which the electrical interconnections of the lighting and/or signalling device 1 pass.

In order to allow the correct positioning, alignment and centering of device 1 inside the body housing C, the device 1 is provided with a positioning system, called in jargon RPS system (Reference Point System). With reference to FIGS. 1 and 2, such an RPS system allows to position, align and center the housing body 10 with respect to the three axes X, Y and Z inside the housing seat in the bodywork.

In FIGS. 1 and 2, the device 1 is shown as already positioned inside the housing seat of the bodywork C. Axes X, Y and Z must be understood in this sense. Generally, the X-axis identifies the depth dimension of the housing seat of the bodywork, which is normally substantially parallel to the longitudinal axis of the vehicle. The Y-axis identifies the width dimension of the housing seat of the bodywork, which is normally substantially parallel to the transversal axis of the vehicle. Finally, the Z-axis identifies the height dimension of the housing seat of the bodywork, which is normally substantially parallel to the vertical axis of the vehicle.

Preferably, the positioning system RPS of the device 1 comprises:
- at least one positioning element with respect to the Z-axis;
- at least one positioning element with respect to the Y-axis;
- at least one positioning element with respect to the X-axis.

A specific positioning element may perform the positioning function with respect to two different axes.

According to the particular embodiment shown in FIGS. 1 and 2, for example, the RPS of the device 1 comprises:

two positioning elements with respect to the Z-axis, consisting of appendix 13 and a pull screw inserted in the seat 12";

a positioning element with respect to the Y-axis, consisting of a pull screw inserted in the seat 12";

three positioning elements with respect to the X-axis, consisting respectively of a pull screw inserted in the seat 12' and two appendices 41, 42 which protrude from the housing body 10 and are intended to abut against the bodywork C of the vehicle, acting as spacer elements with respect to the depth of the housing seat in the body.

The housing body 10 is therefore equipped with one or more spacer elements 41, 42 with respect to the depth of the housing seat of the bodywork, generally identified as X-axis. Such one or more spacer elements 41, 42 are positioned at the portion of the container body 10 intended in use to face towards the housing seat of the bodywork C.

Advantageously, the aforesaid one or more spacers 41, 42 are arranged on the container body 10 to facilitate the correct positioning of the lighting and/or signalling device 1 inside the housing seat. They are part of the aforesaid positioning system RPS of the device 1.

Figure 3:
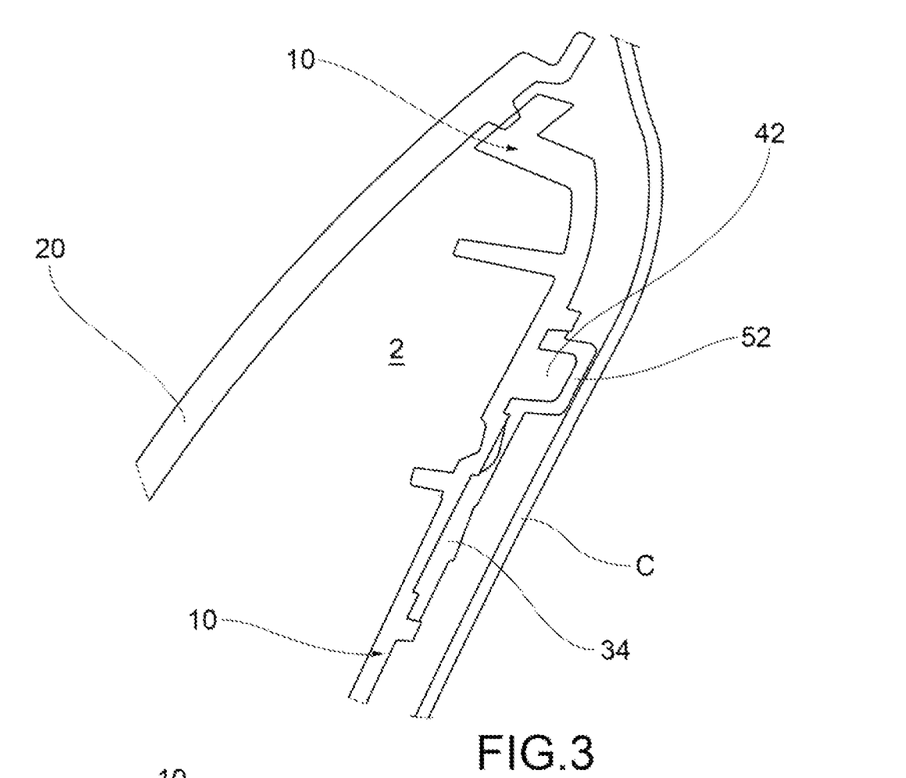
FIGS. 3 and 4 show two enlarged views of two details in FIG. 2, which are highlighted by the circles indicated by III and IV, respectively, and which relate to portions of the lighting device fitted with spacer elements of the lighting device itself in the housing seat obtained the vehicle bodywork.
Figure 4:
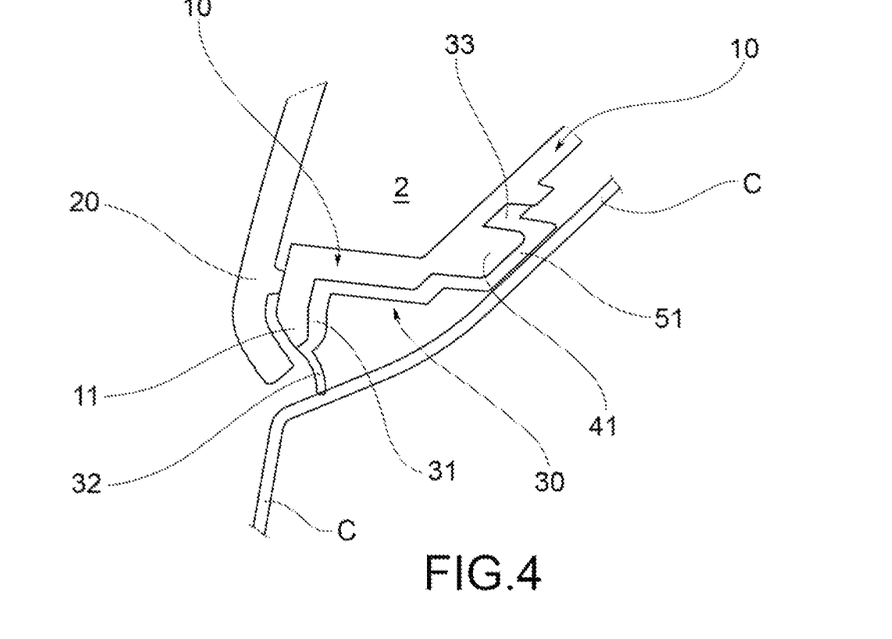

More in detail, as shown in particular in FIGS. 2, 3 and 4, each of said one or more spacer elements 41, 42 consists of an appendix which protrudes from the housing body 10 in a predetermined position and is intended to abut against the bodywork C of the vehicle in the housing seat.

Preferably, the aforesaid one or more spacer elements 41, 42 are made near the perimeter edge 11 of the container body 10 so that they are more easily visible during installation and thus facilitate the operations of assembly of the lighting and/or signalling device 1 in the respective housing seat provided in the bodywork.

Each of said spacer elements 41, 42 is provided with a cap 51, 52 made of elastomeric material applied to cover at least one free end portion of said spacer element 41, 42.

The elastomeric caps 51, 52 are used to prevent direct contact between the spacer elements 41, 42 and the bodywork. Direct contact is avoided to protect the surface integrity of the vehicle body, which is subject to continuous friction with the spacer elements, during vehicle use. In this manner, the elastomeric caps avoid the onset of corrosive phenomena of the painted sheet metal due to the abrasion of the paint itself at the points of contact with the spacer elements.

According to one embodiment, the cap made of elastomeric material 51, 52 of each of said one or more spacer elements 41, 42 is made in one piece with said first gasket 30 made of elastomeric material.

In one embodiment, and as shown in particular in FIGS. 8 and 9, the cap 51, 52 of each of said one or more spacer elements 41, 42 is made on a tongue 33, 34 made of elastomeric material, which extends from the main support body 31 of the aforesaid first gasket 30 towards the inside of the housing body 10.

In one embodiment, the aforesaid tongue 33, 34 is substantially flat so as to create as little thickness as possible between container body 10 and bodywork.

In one embodiment, as shown in FIG. 9, the first gasket 30 is configured so that the main support body extends substantially on one plane. In particular, such a tongue 33, 34, preferably flat, can lie on the same plane on which the main body 31 extends, so as not to create strains on the first gasket 30 and thus compromise its functionality. In particular, when device 1 is installed, the plane on which the main body 31 extends is substantially orthogonal to the X-axis, i.e. it is substantially orthogonal to the depth dimension of the housing seat on the bodywork C.

The aforesaid tongue 33 can be conformed only to connect a cap to the main support body 31 and thus have a limited extension to such a function. This is the case of the tongue 33 which supports the cap which is indicated in the figures by reference numeral 51 and is intended to engage the spacer element 41. In this case, the extension of the tongue 33 is limited to cover the minimum distance separating the main support body 31 from the corresponding spacer element 41.

Alternatively, the tongue 34 may be conformed not only to connect a cap to the main support body 31, but also to engage other portions of the container body 10. This is the case of the tongue 34 which supports the cap which is indicated in the figures by reference numeral 52 and is intended to engage the spacer element 42. In such a case, the extension of the tongue 34 is not limited to cover the minimum distance separating the main support body 31 from the respective spacer element 42, but has a wider extension. The tongue portion with an additional extension may be used to create an additional watertight barrier in one or more portions of the container body 10 near the spacer element.

In one embodiment, the cap made of elastomeric material 51, 52 of each of said one or more spacer elements 41, 42 is made in one piece with the first gasket 30 in elastomeric material by co-molding.

The cap 51, 52 made of elastomeric material can be made of the same elastomeric material as the main body 31 of the first gasket 30. In such a manner, it does not influence the production process of the first gasket 30.

In particular, the aforesaid elastomeric material is chosen in the group consisting of thermoplastic polymeric materials, e.g. thermoplastic polyurethane rubber (TPU, Thermoplastic Polyurethane).

Alternatively, cap 51, 52 made of elastomeric material may be manufactured with a different elastomeric material from that of which the main body 31 of the first gasket 30 is made. In such a manner, it is possible to differentiate the materials as a function of the main functions of the two parts: anti-friction for the cap and hydraulic sealing for the main body of the first gasket.

In particular, the main body 31 of the first gasket 30 is made of an elastomeric material chosen in the group consisting of thermoplastic polymeric materials, e.g. polyurethane thermoplastic rubber (TPU, Thermoplastic Polyurethane), while said cap 51, 52 is made of an elastomeric material chosen from the group consisting of silicone polymers.

There are many advantages of making in one piece the elastomeric cap 51, 52 of each of the aforesaid one or more spacer elements 41, 42.

Firstly, it is no longer necessary to apply adhesive film to the caps. Indeed, by virtue of the invention, the caps are held in position by the first gasket, because they are made in one piece, being co-molded on the main body 31 of the gasket itself. This reduces the risk of them detaching from the spacer elements, making the presence of the adhesive film unnecessary.

Secondly, there is no longer any need for a specific production process for the caps, as they are simply portions of the first gasket.

This as a whole simplifies the production process of the caps themselves, with benefits in terms of cost reduction.

The stock management of the components of device 1 is also positively impacted. The caps no longer have to be handled as separate components because they are incorporated in the first gasket.

Last but not least, the assembly of the caps on the housing body is also simplified. Indeed, they are mounted on the respective spacer elements at the same time as the first gasket is mounted on the housing body and their positioning is guided by the positioning of the gasket itself. The assembly of the caps no longer needs to be inserted in the assembly sequence of the device as a separate step.

Therefore, due to the invention, a lighting and/or signalling device 1 can, therefore, be made which continues to be equipped with elastomeric caps for the spacer elements, whilst simplifying the production, management and assembly of the caps.

Due to the invention, it is, therefore, possible to maintain the full functionality of device 1 and at the same time satisfy a very felt need of boosted a streamlined manufacturing rationalization, aimed at containing costs.

The manufacturing of the caps in one piece with the first gasket has beneficial effects both on the functionality of the first gasket and on the assembly of it on the housing body.

Indeed, the caps 51, 52 become additional anchoring points for the first gasket on the container body, thereby reducing the risk that it may move from their correct position with use.

Moreover, having to engage the spacer elements which have easily identifiable positions on the container body, the caps can guide the correct positioning of the first gasket on the container body itself, thereby facilitating its assembly.

The invention thus devised therefore reaches the set objects.

Obviously, it may also be able to assume embodiments and configurations which are different from than the one illustrated above in its practical embodiment without departing from the present scope of protection.

Furthermore, all parts may be replaced by technically equivalent elements and the dimensions, shapes and materials used may be any as required.

The invention claimed is:

1. A lighting and/or signalling device for motor vehicles comprising:
   a container body, which is intended to be associated with the bodywork (C) of a vehicle at a dedicated housing seat;
   a lenticular body, placed to close a mouth of the container body so as to form a housing chamber;
   at least one light source arranged inside the housing chamber;
   a first gasket made of elastomeric material, which extends along at least one part of a perimeter edge of the container body and which in use defines a barrier to the ingress of water and/or foreign bodies between the container body and the bodywork (C),
   wherein the container body is provided with one or more spacer elements, each of which consists of an appendix which protrudes from the container body in a predetermined position and is intended to abut against the bodywork (C) in the housing seat, each spacer element being provided with a cap made of elastomeric material applied to cover at least one free end portion of said spacer element,
   wherein the cap made of elastomeric material of each of said one or more spacer elements is made in one piece with said first gasket made of elastomeric material,
   wherein said first gasket includes a main support body at which said first gasket is connected to the container body and from which a sealing lip extends and wherein the cap of each of said one or more spacer elements is obtained on a tongue made of elastomeric material wherein the tongue has only one edge that is attached to the main support body and the tongue extends from said main support body towards the inside of said container body, and
   wherein the sealing lip extends from the main support body independently from the tongue.

2. The device as set forth in claim 1, wherein said tongue is substantially flat, said tongue lying preferably on the same plane on which said main body extends.

3. The device as set forth in claim 1, wherein one or more spacer elements are obtained near the perimeter edge of the container body.

4. The device as set forth in claim 1, wherein the cap made of elastomeric material of each of said one or more spacer elements is made of the same material as the main body of the first gasket.

5. The device as set forth in claim 4, wherein said elastomeric material is chosen from the group consisting of thermoplastic polymeric materials.

6. The device as set forth in claim 4, wherein said elastomeric material is polyurethane thermoplastic rubber.

7. The device as set forth in claim 1, wherein said first gasket covers only a part of the perimeter edge of the container body.

8. The device as set forth in claim 1, comprising a second elastomeric gasket which acts as a barrier for the ingress of water and/or foreign bodies into the housing chamber.

9. The device as set forth in claim 1, wherein said one or more spacer elements are part of a positioning system RPS of the device in the housing seat of the bodywork (C).

10. A lighting and/or signalling device for motor vehicles comprising:
    a container body, which is intended to be associated with the bodywork (C) of a vehicle at a dedicated housing seat;
    a lenticular body, placed to close a mouth of the container body so as to form a housing chamber;
    at least one light source arranged inside the housing chamber;
    a first gasket made of elastomeric material, which extends along at least one part of a perimeter edge of the container body and which in use defines a barrier to the ingress of water and/or foreign bodies between the container body and the bodywork (C),
    wherein the container body is provided with one or more spacer elements, each of which consists of an appendix which protrudes from the container body in a predetermined position and is intended to abut against the bodywork (C) in the housing seat, each spacer element being provided with a cap made of elastomeric material applied to cover at least one free end portion of said spacer element, and
    wherein the cap made of elastomeric material of each of said one or more spacer elements is made in one piece with said first gasket made of elastomeric material by co-molding.

11. A lighting and/or signalling device for motor vehicles comprising:
    a container body, which is intended to be associated with the bodywork (C) of a vehicle at a dedicated housing seat;

a lenticular body, placed to close a mouth of the container body so as to form a housing chamber;

at least one light source arranged inside the housing chamber;

a first gasket made of elastomeric material, which extends along at least one part of a perimeter edge of the container body and which in use defines a barrier to the ingress of water and/or foreign bodies between the container body and the bodywork (C), wherein the container body is provided with one or more spacer elements, each of which consists of an appendix which protrudes from the container body in a predetermined position and is intended to abut against the bodywork (C) in the housing seat, each spacer element being provided with a cap made of elastomeric material applied to cover at least one free end portion of said spacer element, wherein the cap made of elastomeric material of each of said one or more spacer elements is made in one piece with said first gasket made of elastomeric material, and wherein the cap made of elastomeric material of each of said one or more spacer elements is made of a material different from the one of which the main body of the first gasket is made.

12. The device as set forth in claim 11, wherein the main body of the first gasket is made of an elastomeric material chosen in the group consisting of thermoplastic polymeric materials, while said cap is made of an elastomeric material chosen from the group consisting of silicone polymers.

13. The device as set forth in claim 11, wherein the main body of the first gasket is made of polyurethane thermoplastic rubber, while said cap is made of an elastomeric material chosen from the group consisting of silicone polymers.

* * * * *